United States Patent
Shores et al.

(10) Patent No.: US 8,839,145 B2
(45) Date of Patent: Sep. 16, 2014

(54) PROVIDING ACCESS TO CONTEXTUAL ACTIONS AND INFORMATION

(75) Inventors: Melody Shores, Excelsior, MN (US); Thao Bich Nguyen, San Francisco, CA (US); Ray Soon Waldin, Jr., San Francisco, CA (US); Joyce Etsuko Ohgi, San Francisco, CA (US); Kathleen Maguire Candland, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 807 days.

(21) Appl. No.: 12/356,789

(22) Filed: Jan. 21, 2009

(65) Prior Publication Data
US 2010/0185979 A1 Jul. 22, 2010

(51) Int. Cl.
*G06F 3/048* (2013.01)
*G06F 3/0481* (2013.01)

(52) U.S. Cl.
CPC .................................. *G06F 3/0481* (2013.01)
USPC ......................................................... 715/809

(58) Field of Classification Search
USPC ......................................................... 715/809
See application file for complete search history.

(56) References Cited

U.S. PATENT DOCUMENTS

| | | | |
|---|---|---|---|
| 5,736,974 A * | 4/1998 | Selker | 715/862 |
| 6,717,600 B2 | 4/2004 | Dutta et al. | |
| 7,797,276 B1 * | 9/2010 | Yang | 707/636 |
| 2002/0075333 A1 * | 6/2002 | Dutta et al. | 345/862 |
| 2004/0085367 A1 * | 5/2004 | Hagarty, Jr. | 345/854 |
| 2006/0095865 A1 | 5/2006 | Rostom | |
| 2006/0242666 A1 * | 10/2006 | Alba et al. | 725/40 |
| 2007/0198950 A1 * | 8/2007 | Dodge et al. | 715/815 |
| 2009/0083676 A1 * | 3/2009 | Flanagan et al. | 715/853 |

OTHER PUBLICATIONS

Sun Microsystems, Inc, "How to Use the System Tray", http://java.sun.com/docs/books/tutorial/uiswing/misc/systemtray.html, 1995-2008.
CNET Networks, Inc., "Add detailed pop-up descriptions to folder icons in Windows XP", http://articles.techrepublic.com/5100-10878_11-5587642.html, 2008.

* cited by examiner

*Primary Examiner* — Peiyong Weng
(74) *Attorney, Agent, or Firm* — Miles & Stockbridge P.C.

(57) ABSTRACT

Systems and methods for providing access to actions and information are described in the present disclosure. According to one example, an embodiment of a method is described. The method comprises analyzing a position of a mouse pointer on a graphical user interface (GUI), the mouse pointer being controlled by a user-operated mouse. Also, a glyph is displayed on the GUI, wherein the glyph is associated with an object that is displayed on the GUI. The method also includes displaying a target in the location of the glyph when the mouse pointer is positioned within a field of the glyph. Furthermore, a dialog box is opened when a mouse click is detected and when the mouse pointer is within a field of the target.

25 Claims, 6 Drawing Sheets

FIG. 8
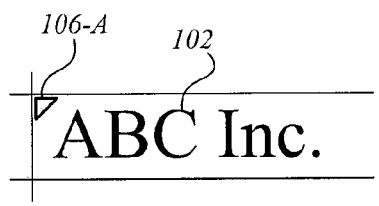
FIG. 9A
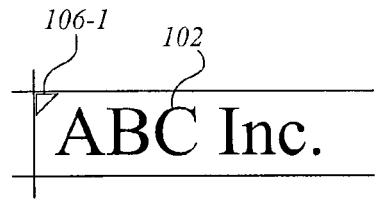
FIG. 10A
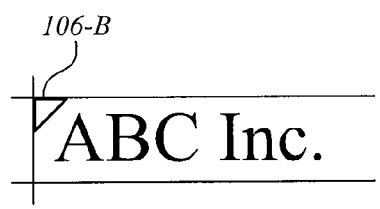
FIG. 9B
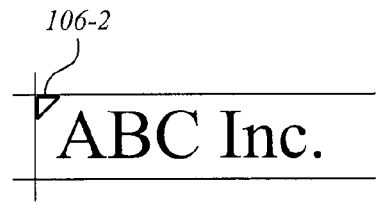
FIG. 10B
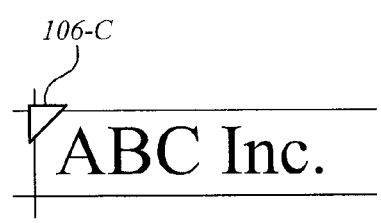
FIG. 9C
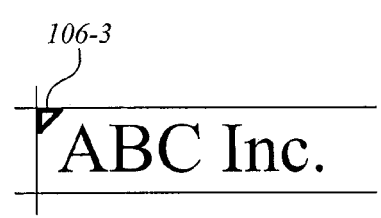
FIG. 10C

FIG. 11

| Opportunities | | |
|---|---|---|
| View: My Opportunities ▾ | | |
| Opportunity Name | Revenue | Account |
| Laboratory Upgrade | $25,000 | XYZ Corp. |
| 20 Microscopes | $35,000 | CDC |
| 30 Microscope 3500s | $18,500 | ABC Inc. |
| Service Agreement Pkg. | $12,000 | HalciTech |
| Microscope Upgrade | $22,000 | Pfizer |

FIG. 12

| Abigail Hudson | Vice President | 12/ |
|---|---|---|
| Oliver Williams | Instructor | 04/ |
| Nathaniel Jones | Programmer | 01/ |
| Alicia Reynolds | Project Manager | 07/ |

View Profile

/ Contact / Workload /

Manager: Candice Harting

Alicia Reynolds
*Project Manager*

Company       ABC Inc.
Department    Development
Email 1       alicia.reynolds@abcinc.com
Current time  10:30 am (CST)
Work          1-952-555-1212
Home          1-952-555-3333
Mobile        1-952-555-4321
Network       Plaxo ▾

☺ Chat
 View notes
 Schedule a meeting
 Add to my address book
 Assign to-do
 View profile Street Address
P.O. Box 999
San Diego, CA 92112
USA

[Close]

PROVIDING ACCESS TO CONTEXTUAL ACTIONS AND INFORMATION

TECHNICAL FIELD

The present disclosure generally relates to procedures for opening dialog boxes and the like. More particularly, the embodiments described herein relate to systems and methods for progressively providing access to contextual actions and information.

BACKGROUND

Conventional graphical user interfaces (GUIs) allow users to access actions and/or information on demand. In some cases, the actions and information may be related to a particular object that is displayed in some fashion on the GUI. Currently, if a user wants to perform actions on an object of interest or discover further information about the object, the user has several choices. FIGS. 1-4 illustrate some examples of how actions and/or information can be accessed according to conventional methods.

FIG. 1 is a diagram illustrating a portion of a conventional GUI 10 of a word processing program. It is known that a user can access certain actions that are available by selecting one of several action categories listed in a toolbar 12, which may be presented near the top of or at any other suitable location on GUI 10. In this example, the action category "Edit" is selected, e.g., by a mouse click on an Edit field 14, by pressing the "e" key on a keyboard, etc. When selected, a drop down menu 16 is presented as a superimposing layer on top of a portion of GUI 10. Drop down menu 16 in this example includes a list of actions that may be performed.

A problem with this method is that the fields 14 and drop down menus 16 are usually located somewhere on the page a distance away from a particular object that the user may wish to perform actions on, and the user may have to go out of context of the current task to locate the actions. Then, the user must try to determine if the action is actually applicable to the object that they are working with. After performing the actions, the user may be required to navigate back to the original task to resume where they left off.

FIG. 2 is a diagram illustrating a portion of a document 20 being edited in a conventional word processing system. It is known that a user can access certain actions that are available by pressing the right button on a mouse, or "right-clicking," when the mouse pointer is positioned over a specific word in the document 20. In this example, the word "maintain" 22 is selected. By right-clicking word 22, the word processing system displays a menu 24, which includes a number of possible actions that can be performed on word 22. However, such a menu can be difficult to discover and only provides actions without supporting information about the actions. Although supporting information about the actions may not be necessary when acting upon a simple object such as a word or text, objects in enterprise applications often involve such complexity that more information may be needed before one can act.

FIG. 3 is a diagram illustrating a portion of a conventional user interface 30 having a number of icons 32 positioned thereon. Generally, each icons 32 is located adjacent to a respective object of which more information can be accessed. By selecting or clicking on a particular icon 32 next to a respective object, the user can call up additional information about the object. The additional information may be presented as a window that partially superimposes user interface 30. A problem with this technique, however, is that, since many objects may each have their own respective icon, the icons can clutter the screen and result in cognitive overload for the user. Also, the user may be hesitant to click on an icon 32 if the user is not sure what actions might be taken as a result of clicking.

Instead of the use of icons, some systems may use links on the objects, which may be indicated, for example, by an underlining of an object, word, or phrase. However, a problem with the use of links is that a user may confuse the link with other common usages of links. Thus, the user may worry that they will be navigated to another page and lose their current place.

FIG. 4 is a diagram illustrating a portion of a conventional web page 40 used to provide information about a particular topic. In this example, web page 40 presents information about films or movies. It can be seen that by moving a mouse, a user can hover a mouse pointer 42 over a field 44 that is linked to additional information. In this example, field 44 is linked with the film "Amores Perros." When mouse pointer 42 hovers over field 44, web page 40 is designed to automatically present a superimposed pop-up window 46 over a portion of web page 40. Pop-up window 46 includes additional information of the linked field 44. When the mouse is moved such that mouse pointer 42 no longer hovers over field 44, then web page 40 is designed to dismiss or remove pop-up window 46

Some web pages or GUIs may be designed to have any number of linked fields, where each field is associated with a pop-up window. Thus, the user can move the mouse over the user interface and hover over one field for calling up the respective pop-up window until the mouse is moved off the field. If desired, the user can then hover the mouse over another field to pop up another contextual pop-up window, and so on.

A problem with the calling up of pop-up windows by the hovering mouse technique is that this system presumes the intentions of the user based on the location of the mouse on the screen. At times, the location of the mouse moving around on a screen can be arbitrary. It can be annoying and distracting to a user when a pop-up window is called up unintentionally. It can be especially annoying when the user interface is not merely an informational screen, but perhaps a transactional screen. Therefore, because of the possibility of the inadvertent opening of a pop-up window, this system can cause problems for the user. In some situations, a user can easily be distracted from a current task by attempting the awkward procedure of attempting to move the mouse around possible fields to avoid the various pop-up windows.

In addition, in order to keep the pop-up window from disappearing, the mouse must be kept over the respective field. However, when the mouse is inadvertently moved off the field, the window is dismissed prematurely even when the user may still be interested in the contents of the window. The inadvertent dismissal of the pop-up window can also be aggravating to the user and can distract the user from the current task.

Furthermore, some systems are designed to present the pop-up window after a certain delay in order to avoid the pop-up of several windows if a mouse is moved quickly across the screen having multiple linked fields. A problem with the delay aspect of the pop-up window is that a user may have to wait an undesirable length of time to call up the information he/she needs. Another problem is that a slow moving mouse may pop up several pop-up windows, even when the mouse has already passed the fields of multiple linked objects.

SUMMARY

The present disclosure describes several embodiments of systems and methods for providing access to actions and information that are associated with one or more object displayed on a user interface. In one embodiment of a method, the method includes analyzing a position of a mouse pointer on a graphical user interface (GUI). The mouse pointer is controlled by a user-operated mouse. The method further includes displaying a glyph on the GUI, wherein the glyph is associated with an object that is displayed on the GUI. In addition, the method includes displaying a target in the location of the glyph when the mouse pointer is positioned within a field of the glyph. Furthermore, a dialog box is opened when a mouse click is detected and when the mouse pointer is within a field of the target.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

FIG. 8 is a diagram of a graphical user interface (GUI) configured to present glyphs according to one embodiment.

FIGS. 9A through 9C are diagrams of a portion of the GUI of FIG. 8 in which an example of the progressive feature of the glyphs is illustrated, according to a first embodiment.

FIGS. 10A through 10C are diagram of a portion of the GUI of FIG. 8 in which an example of the progressive feature of the glyphs is illustrated, according to a second embodiment.

FIG. 11 is another diagram of the GUI of FIG. 8 when a target is presented according to one embodiment.

FIG. 12 is a diagram of a dialog box opened in response to a mouse click on a target, according to one embodiment.

DETAILED DESCRIPTION

Figure 1:
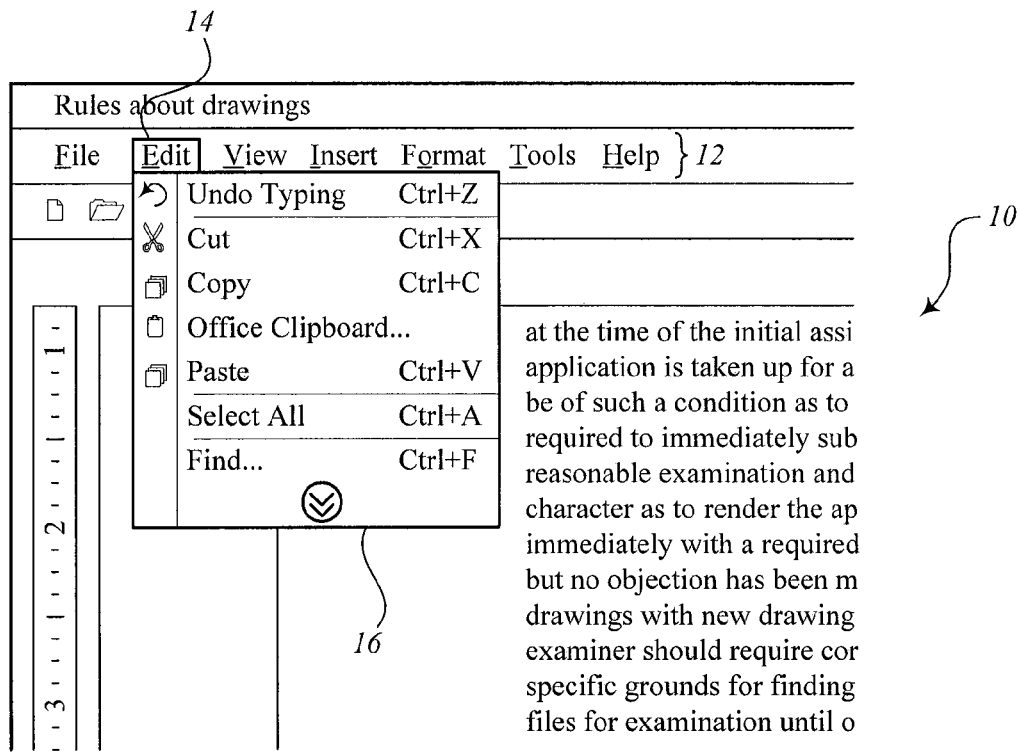
FIG. 1 is a diagram illustrating a conventional system for providing a drop down menu.
Figure 2:
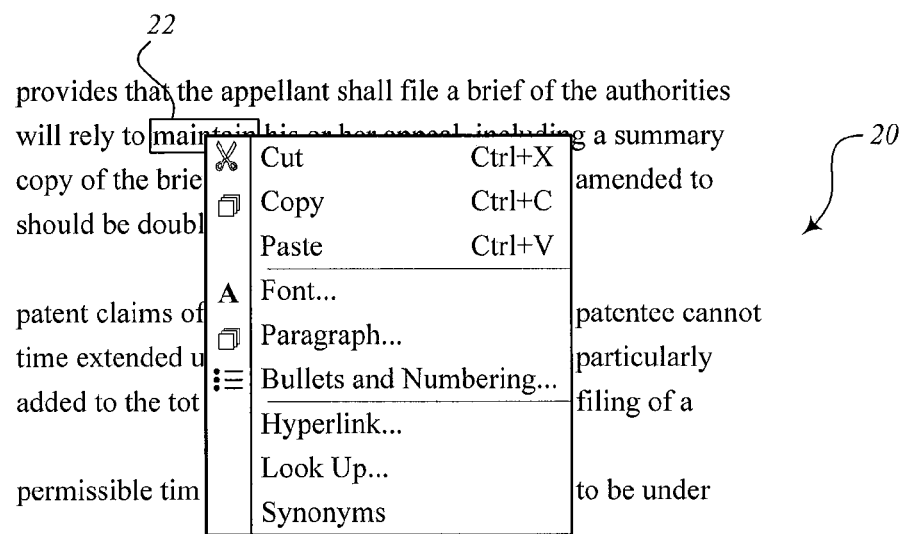
FIG. 2 is a diagram illustrating a conventional system for providing a menu in response to a right-click.
Figures 3, 4:
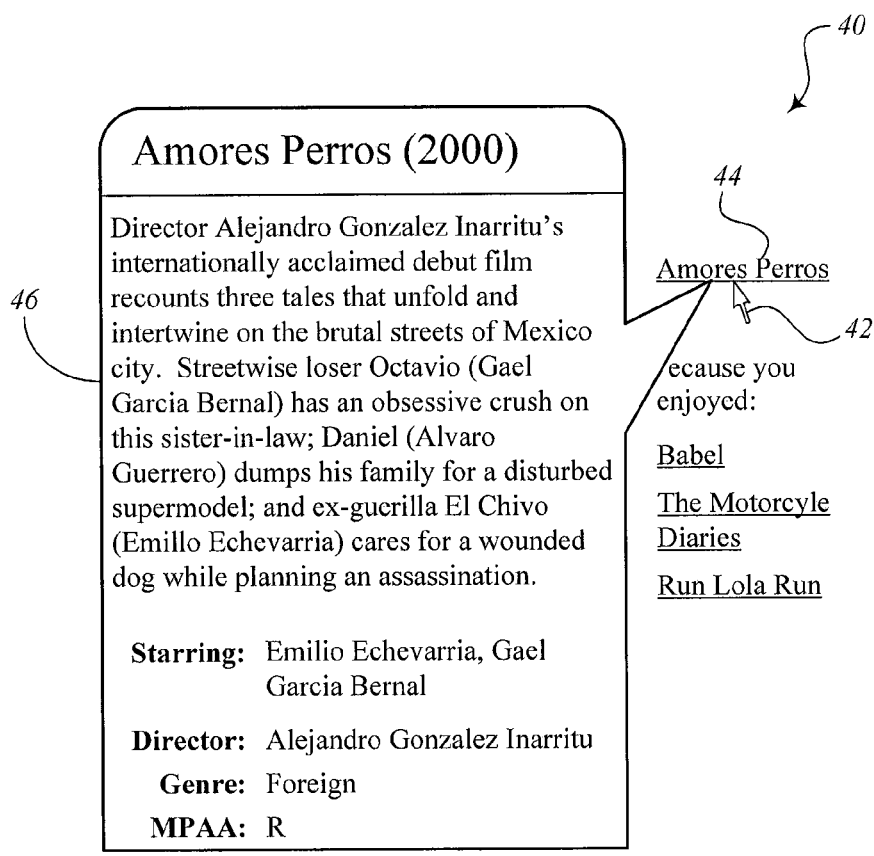
FIG. 3 is a diagram illustrating a conventional system having icons that can be selected for presenting additional information about respective objects.
FIG. 4 is a diagram illustrating a conventional system for providing a pop-up window.

Many systems and methods that are currently in use are capable of providing additional information on demand to a user of a computer system. Some examples of these systems include the use of drop down menus, right click operations on certain objects to call up a number of menu items, clicking on linked items to navigate to another page or to call up additional windows, automatic pop-up windows that appear when the location of a mouse pointer is positioned over a region of an item, etc.

However, one problem with the conventional systems for accessing additional actions for an object is that many of these systems only present actions and do not present additional decision-support information to help the user decide whether to initiate the actions. For example, a problem may arise if a user wishes to make a phone call to a specific employee but must first find the correct phone number. If the person the user is trying to contact shares the same or similar name as another employee, the user may be hesitant to make a call if the user is not sure if the information presented on the user interface refers to the correct person. This action-only display works when performing discreet actions within very simple contexts, such as changing a word to bold, but supporting information is usually needed when dealing with more complex items, such as people, organizations, and some types of items.

In addition, the conventional solutions cannot be applied universally on all kinds of objects, such as text fields, table cells, tree controls, page headers, etc. This means that additional kinds of access methods would have to be derived for some types of objects. Otherwise, some objects might not be able to be used for accessing contextual information and actions of the objects.

However, the present disclosure describes embodiments for overcoming the problems of the conventional systems by progressively providing access to additional actions and/or information. This progressive access technique can provide a more natural experience for a user and allows the user to stay focused on a particular task without diverting the user's attention. Also, the progressive access technique does not allow pop-up windows to open without an intentional mouse click on the part of the user. In addition, by analyzing the position of the mouse pointer with respect to a particular region with respect to an object instance, an indication of the availability of additional information is made clearly to the user in the form of a visual cue or "glyph," as mentioned in more detail below. The glyph becomes more visible as the mouse pointer is moved closer to the glyph. Furthermore, when the mouse pointer is positioned over or near the glyph, a small yet easily-hittable target is displayed next to the object instance allowing the user to easily click the target if desired. By clicking on the target, a dialog box is opened to reveal the contextual actions and information associated with the object.

Upon entry of a user interface that provides progressive access to contextual actions, the user interface initially does not display additional buttons and/or affordances that would indicate that contextual actions are available. This helps to maintain a clean and uncluttered interface. When the user rolls the mouse over an area or region containing an object of interest, the glyphs appear, indicating which fields in that region have contextual actions and/or information available with respect to these fields. This lets the user know that there is probably more information they can find out about those fields. Different thresholds can be used to trigger the display of the glyphs. The visual cues or glyphs can be any kind of graphic that does not interfere with the visibility for the rest of the area.

When the user rolls over the field containing the object of interest, no additional interaction occurs, such as a pop-up, although the glyph is enhanced to indicate that more interactions are available. This avoids the inadvertent, and sometimes annoying, pop-up display when the user is interacting with the screen.

When the user moves the mouse pointer over the glyph or over an invisible hot spot area surrounding the glyph, a more visible button is displayed. In one embodiment, once the mouse pointer rolls over the hot spot area, the glyph morphs into a larger button. In some embodiments, the glyph can be changed to show greater visibility, such as an enlarged target size, animations, movements, etc. The more visible form can be accompanied by an increase in the size of a clickable target, which can be easier for the user to hit. The target size surrounding the glyph can also be varied, so it is possible to change the visibility and target size from a rollover at a greater or lesser distance from the glyph.

Once the enhanced button is displayed, the user needs to click it in order to display a dialog box according to some embodiments. Rolling over the button causes no further interaction by default. This avoids having interactions occur accidentally when the user is interacting with the screen in other ways. In other embodiments, however, the dialog box can be displayed on mouse rollover, rather than on click, which may be beneficial in certain circumstances.

According to the embodiments in which clicking the enhanced target calls up the dialog box, the user clicks the enhanced button and the dialog box is displayed. The dialog box presents the most frequently used information and actions for the respective object that the user is interested in. This way, the user can see needed information without losing his/her place in the current task and can then determine what actions to take prior to taking them.

The progressive access button has the following characteristics, which make it superior to prior contextual actions. First, it can be widely used yet remain unobtrusive, unlike icon buttons. It is available in the immediate context of an object, but it does not get in the way, unlike hover-over pop-ups from links, and unlike menus or buttons that are not positioned next to the object of interest. Also, it makes information and actions available on demand, not by accident, unlike hover-over pop-ups from links. It allows information and actions to remain available without accidentally dismissing the dialog box, unlike hover-over pop-ups from links. It is easily discoverable, but doesn't clutter the screen or overwhelm the user, unlike icon buttons, right-click menus, or other menus. And it can be used on virtually any kind of control for greater interaction consistency (including table cells, text fields, drop-downs, page headers, tree controls, etc.), unlike any of the conventional solutions.

The progressive access technique allows software designers to create uncluttered screens with less cognitive load on the user while providing easy, intuitive access to frequently used actions and information for each object. This can be done in the context of traditional transactional screens, which are typically already information dense, without interfering with the regular work. This also allows the support of unforeseen ad hoc tasks throughout the system. Also, the progressive access technique provides greater flexibility to the user and does not require the user to navigate away from the current task to search for these actions or information. Applications that provide progressive access can be incorporated in any system, such as an enterprise software system having transactional pages or transactional systems. Some actions, for example, may be related to any types of items, budgets, contacts, etc.

Figure 5:
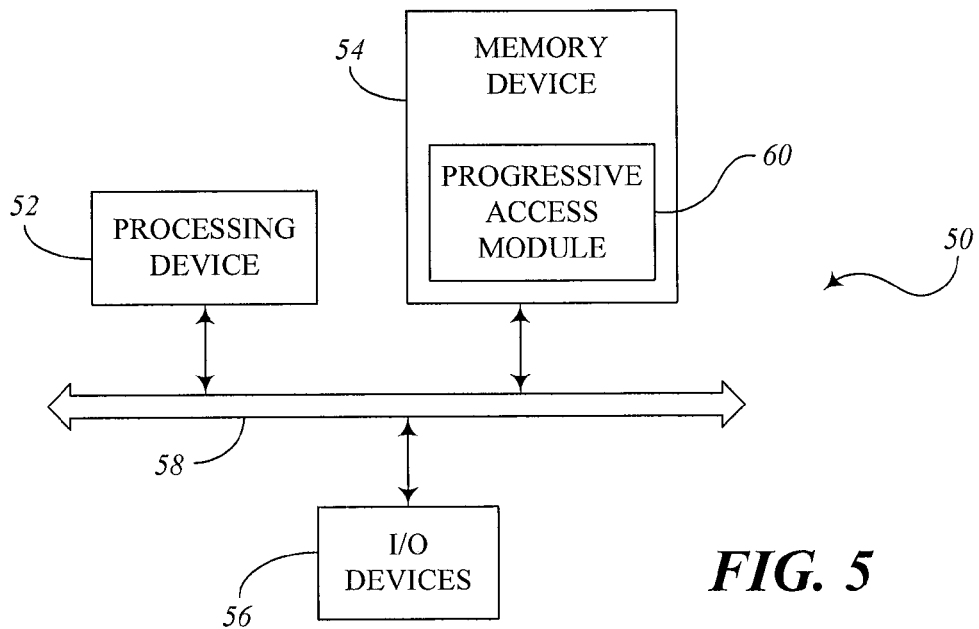
FIG. 5 is a block diagram of a computing system according to one embodiment.

FIG. 5 is a block diagram of an embodiment of a computing system 50 for providing access to available actions and information in a progressive manner. Particularly, computing system 50 may be a computer, data processing system, or other suitable electronic device for executing logic instructions, e.g., software applications. In the embodiment shown in FIG. 1, computing system 50 includes a processing device 52, a memory device 54, and input/output ("I/O") devices 56, each interconnected via a bus interface 58. Memory device 54 includes, among other things, a progressive access module 60.

Processing device 52 may be a general-purpose or specific-purpose processor or microcontroller. Memory device 54 may include one or more internally fixed storage units, removable storage units, and/or remotely accessible storage units. The storage units can be configured to store information, data, instructions, and/or software code. The storage units may include any suitable combination of volatile memory and/or non-volatile memory. I/O devices 56 may include input mechanisms such as keyboards, keypads, cursor control devices, or other data entry devices. The input mechanisms enable a user to enter information or instructions. I/O devices 56 may also include output devices, which may be computer monitors, display screens, audio output devices, printers, or other peripheral devices for communicating information to the user. I/O devices 56 may include a display for presenting one or more graphical user interfaces (GUIs) for the user's interaction.

In general, computing system 50 comprises logic processing, which may be implemented in software, firmware, hardware, or any combination thereof. The logic processing is configured to control GUIs or other suitable data presentation and/or interaction systems. Particularly, the logic processing is capable of managing how actions and information in a specific context of an object of the GUI are accessed by a user. Although the embodiments described in the present disclosure generally refer to logic processing that is configured as software and generally described as progressive access module 60, it should also be noted that the logic processing may alternatively be configured in hardware within processing device 52.

Initially, progressive access module 60 controls the display of glyphs to indicate that addition actions and information are available for certain object instances on the GUI. When the user moves the mouse toward the glyph, the glyph becomes more distinct or more visible. When the mouse position is positioned over or hovered over the glyph, progressive access module 60 causes the glyph to morph or change into a target that is large enough to be hit. Although the target is large enough to be clicked on easily, it can be sized to be not too large to interfere with the other objects on the page. To access the additional actions and information, the user clicks on the target and progressive access module 60 controls the opening of a dialog box to show the available actions and information that supports the actions. To close the dialog box, the user clicks on a "close" button or an "X" button.

The progressive access technique associated with the functionality of progressive access module 60 can include three main parts for allowing the user to call up additional information and/or commands. The first part is a small, subtle "glyph" that is displayed in a particular location with respect to an object instance. The glyph may be positioned adjacent to, near, on, superimposing, or at any other suitable relative positions with respect to the object instance. It could be in the upper left hand corner of the field of the object. The objects may include more than just table cells or read-only fields, but can include any component or element that renders data for which information can be gathered. In this respect, an object can be editable text fields, read-only fields, table cells, page headers, etc.

When the mouse pointer is far away from the glyph, the visibility or intensity of the glyph can be very low or even practically invisible. However, as the mouse pointer is moved closer to the glyph, indicating a possible intention on the part of the user to receive more information about the object, the glyph becomes more intense. Intensity can be seen or measurable according to any suitable characteristic, such as by size, brightness, flashiness, etc. For example, intensity may be presented as brightness, where a dim glyph may be used when the mouse is far away and a brighter glyph can be used when it is moved closer. Another example of intensity may include a color versus grayness effect, where a color is intensified as the mouse moves closer. In some embodiments, the glyph could be an orange triangle located near the object instance. Also, intensity may be presented by the size of the glyph, such that when the mouse is moved closer to the glyph, the glyph becomes bigger.

There may be, for example, three or more distinct levels of intensity or visibility of the glyph. A first could be invisible or very faint. The last could be very visible, intense, bright, or distinct. There may also be one or more intermediate levels. As you reach a nearness threshold, based on the number of pixels away from the target, the glyph becomes more distinct.

For determining the distance between the mouse and the glyph, progressive access module 60 can use a logical measure of proximity. In other embodiments, progressive access module 60 may use an actual pixel distance. The measured distance can be used to determine the intensity of the glyph's display. In some implementations, a first level of intensity can be applied when the mouse is hovering over a table in which the glyph is contained. A second level of intensity can be applied when the mouse is hovering over a row (or column) of the table containing the glyph. And a highest level of intensity can be applied when the mouse is over the actual table cell containing the glyph.

A second part of the progressive access technique is the pop-up or morphing of a target. When the intensity of the glyph reaches a maximum level, indicating that the mouse pointer is over or very near the glyph, then the glyph morphs into the target or the target superimposed over the glyph. The target is small enough where it does not interfere with the information already displayed on the page, but it is big enough where a user can easily hit the target, i.e., mouse click on the target. In some embodiments, the target can have a different appearance than the glyph to more clearly communicate to the user that the additional information is available. Also, the target can be displayed such that the user would feel secure knowing that an unknown command will not be performed without further instruction from the user.

According to some embodiments, the glyphs and targets could be presented as an underline, double underline, dotted underline, etc. In this case, the nearness of the mouse pointer to a central portion of the object can be used to define the distance.

The third part of the progressive access technique involves displaying a dialog box or window that is called up when the user actually clicks on the target. In this way, no inadvertent pop-up windows will be displayed, which can be distracting to the user in a transactional system. Also, the window that is intentionally opened will not automatically close based on the user's mouse position, but only closes when the user purposely clicks on a "close" or "X" button. It can be appreciated that the progressive access technique therefore provides a natural feel for the user. Also, the user can maintain focus on a particular task without requiring the user to move the mouse to another part of the screen, but staying in the vicinity of the object instance to access additional information and a number of operations associated with the object.

A user might be hesitant to perform an action because he/she may not be sure if it is the right one. In one example, the dialog box might have three phone numbers for a particular person to be contacted. In this case, the user may need more information to take the correct action. In some embodiments of a contact dialog, a social network drop down menu may be incorporated in the dialog to find which social networks the person may be active in, such as, for example, Plaxo, LinkedIn, etc.

Not only does the opened dialog box provide available actions, but also provides information supporting the actions. This differs from many conventional affordances, such as drop downs, pop-ups, action menus, etc., which usually provide actions but no information. The contextual support dialog boxes provide actions as well as information that can be used as decision-support when a user is trying to determine whether or not to perform a particular action. This differs from menus that are displayed from icon buttons, menu bars, or right-click actions, which merely display the actions only.

Figure 6:
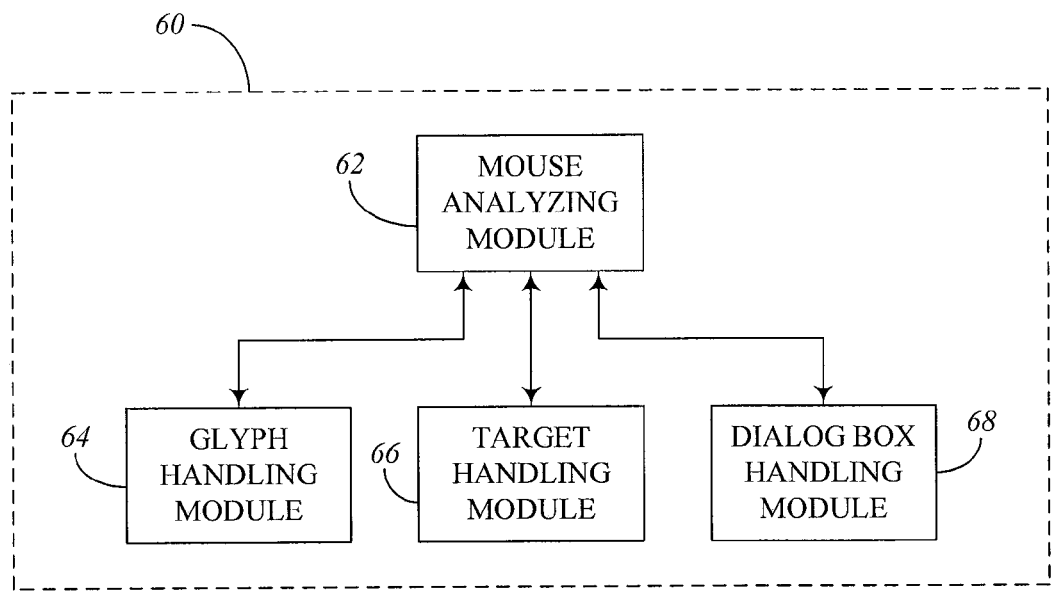
FIG. 6 is a block diagram of the progressive access module shown in FIG. 5 according to one embodiment.

FIG. 6 is a block diagram illustrating an embodiment of progressive access module 60 shown in FIG. 5. In this embodiment, progressive access module 60 includes a mouse analyzing module 62, a glyph handling module 64, a target handling module 66, and a dialog box handling module 68. Although these modules are shown as distinct elements, it should be recognized that some modules can be combined or some functions may be performed by one or more modules. Therefore, the embodiment of FIG. 6 merely represents the major components of progressive access module 60, but can be combined or divided depending on the particular design.

Mouse analyzing module 62 is configured to detect any activities involving a user-controlled mouse. For example, the position of a mouse pointer with respect to the GUI is determined. Particularly, coordinate information of the location of the mouse on the screen can be determined. Also, mouse analyzing module 62 is configured to detect the occurrence of a left mouse click or a right mouse click. Based on this information gathered from mouse analyzing module 62, progressive access module 60 can properly determine how to handle the existence and/or appearance of the glyphs, targets, and dialog boxes, particularly using glyph handling module 64, target handling module 66, and dialog box handling module 68.

Glyph handling module 64 is configured to display glyphs next to the object instances on the GUI. Glyph handling module 64 is able to determine the distance from the mouse pointer to each glyph on the page, based on the information gathered by mouse analyzing module 62. More specifically, the visibility of the glyphs are presented based on the respective distances of the glyphs from the mouse pointer. The distances, for example, may be measured in the number of pixels the glyphs are from the mouse pointer. As mentioned above, visibility of the glyphs can correspond to the size of the glyphs, the brightness of the glyphs, a color/gray characteristic, or other suitable visual parameters.

Target handling module 66 is configured to display a target or other visual cue in the place of a glyph when it is determined from mouse analyzing module 62 that the mouse is located within a field associated with a respective glyph. When the mouse is moved over that glyph, target handling module 66 can superimpose the target over the glyph, morph the glyph into the target, or use any other suitable technique for displaying a different visual cue to indicate to the user that the target can be clicked to gain access to additional information and/or actions. In some embodiments, the target may be the letter "i" that can symbolize "information." In other embodiments, other various designs can be used for the target.

Dialog box handling module 68 is configured to call up a dialog box when it is determined that target handling module 66 is displaying a target and the user clicks the mouse on the target. In particular, the detection of the mouse click on the target can be determined by mouse analyzing module 62 detecting the location of the mouse pointer on a field of the target and detecting the pressing of the left mouse button. The dialog box can be designed to show available actions and supporting information for those actions. Furthermore, progressive access module 60 can be designed in some embodiments to show only the actions and information in context of the object. In this way, the contextual actions and information can be customized by a page designer to provide only the actions and information that may possibly be needed by a user in order to keep the user in the current task.

The embodiments of progressive access module 60 described in the present disclosure can be implemented in hardware, software, firmware, or a combination thereof. When implemented in software or firmware, progressive access module 60 can be stored in memory device 54 (FIG. 5) and executed by processing device 52. Alternatively, when implemented in hardware, progressive access module 60 can be implemented in processing device 52 using discrete logic circuitry, an application specific integrated circuit (ASIC), a programmable gate array (PGA), a field programmable gate array (FPGA), or any combination thereof.

Progressive access module 60, which can be stored partially or fully in memory device 54, in addition to any other software, programs, or computer code including executable logical instructions as described herein, can be embodied in a computer-readable medium for execution by any suitable processing device. The computer-readable medium as described herein can include one or more suitable physical media components that can store the software, programs, or computer code for a measurable length of time.

Figure 7:
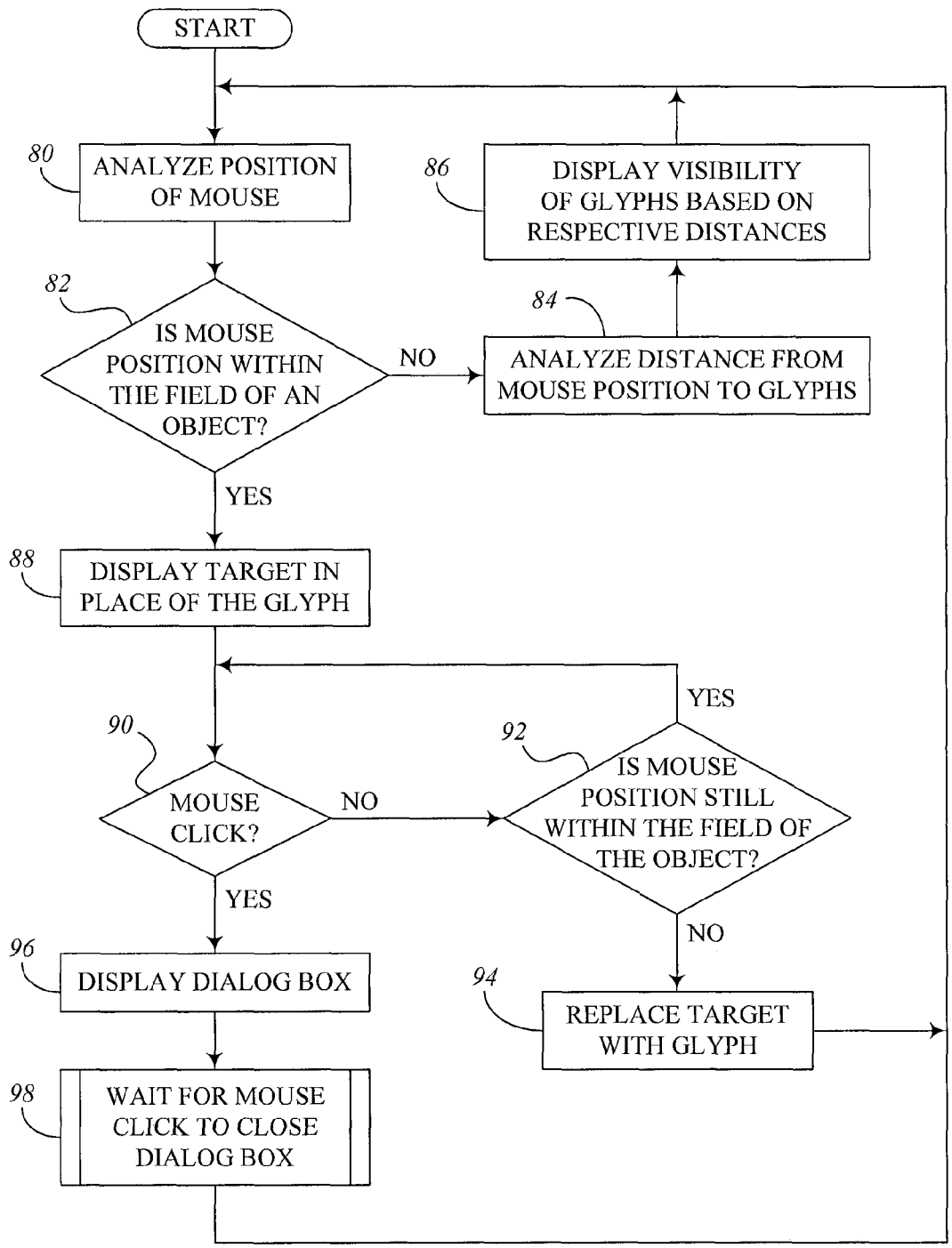
FIG. 7 is a flow diagram illustrating a method for displaying access to additional actions and information in a progressive manner according to one embodiment.

FIG. 7 is a flow diagram illustrating an embodiment of a method for progressively displaying access to additional actions and information of one or more objects of interest displayed on a GUI. As indicated in block 80, the position of a mouse is analyzed with respect to a GUI on which the objects are displayed. As indicated in decision block 82, it is determined whether or not the mouse position is within a field of an object. If it is determined that the mouse position is not within the field of the object, then the method proceeds to block 84. Otherwise, the method proceeds to block 88.

When the mouse is not positioned within the field of the object, the distance from the mouse position to one or more glyphs is analyzed, as indicated in block 84. Each glyph is located adjacent to or near a respective object. In some embodiments, the GUI may include multiple objects each having actions and information accessible via the progressive access method. According to block 86, the visibility of each glyph is displayed based on the distance from the mouse position to the respective glyph. After this, the method returns back to block 80 where a new position of the mouse can be analyzed. Blocks 80, 82, 84, and 86 may be repeated, as necessary, based on the position and/or movement of the mouse.

When it is determined in block 82 that the mouse position is within a field of a particular object, a target is displayed in place of the glyph, as indicated in block 88. In some embodiments, the glyph can morph into the target or the target can be superimposed over the glyph, depending on the particular design. As indicated in decision block 90, it is determined whether or not a mouse click is detected on the target. If no mouse click is detected, then the method proceeds to decision block 92, which indicates that the mouse position is detected again to determine if it is still within the field of the object. If it is no longer over the field of the object, the method proceeds to block 94. As indicated in block 94, the target is replaced with the glyph and the method returns back to block 80 where the analysis of the mouse position is repeated. If it is determined in decision block 92 that the mouse is still within the field of the object, then the method returns to decision block 90 to analyze again whether the mouse click on the target is detected.

When it is determined in decision block 90 that the mouse click on the target is detected, the method proceeds to block 96, which indicates that a dialog box is displayed. Specifically, the dialog box can be superimposed at a suitable location on the GUI. The dialog box may include available actions and information related to the specific object. As indicated in block 98, the method waits for a mouse click that would close the dialog box. Otherwise, the dialog box remains open until the mouse click closes it. The mouse click may include a click on a "close" button, a click on an "X" button, or the like. When the dialog box is eventually closed, the method returns back to block 80 and the method can be repeated indefinitely.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

FIG. 8 is a diagram illustrating an embodiment of a GUI 100 incorporating the progressive access functionality described in the present disclosure. GUI 100 in this embodiment includes a plurality of object instances 102 and a plurality of glyphs 104 and 106. Generally, each object instance 102 corresponds to a respective glyph 104. Regarding the given snapshot of GUI 100 in this example, glyph 106 is shown as being the nearest glyph to a mouse pointer 108. Each glyph 104 is shown as a triangle located at an upper left corner of the respective object instance 102. However, in other embodiments, glyphs 104 may be located at other areas of object instances 102 and may contain any other suitable shape according to the particular design.

It can also be seen in this example that each glyph 104 is shown with a certain visibility based on its distance from mouse pointer 108. In particular, mouse pointer 108 is nearest to glyph 106, which is shown with the greatest visibility. The other glyphs 104 are shown accordingly with less visibility. Glyphs 104 located a considerable distance away from mouse pointer 108 may have a very low visibility or can even be invisible so as not to clutter GUI 100. However, as mouse pointer 108 is moved around the screen, the visibility of each glyph 104 can be changed based on real-time detection of distance of mouse pointer 108 from each respective glyph 104.

FIGS. 9A-9C are diagrams that illustrate a first embodiment of a technique for changing the visibility of glyph 106 shown in FIG. 8 as mouse pointer 108 is moved closer to glyph 106. In these examples, glyph 106 is associated with an object instance 102 of the object "ABC Inc." FIG. 9A illustrates an example of glyph 106-A when mouse pointer 108 is not near to glyph 106. In this case, glyph 106-A is fairly small. FIG. 9B shows an example of glyph 106-B when mouse pointer 108 is moved closer to glyph 106. In this case, glyph 106-B is slightly larger. And FIG. 9C shows an example of glyph 106-C when mouse pointer 108 is very close to glyph 106. In this case, glyph 106-C is large. In these examples, the visibility of glyph 106 equates to the increasing of the size of glyph 106 as mouse pointer 108 is moved closer to glyph 106.

FIGS. 10A-10C are diagrams that illustrate a second embodiment of a technique for changing the visibility of glyph 106 shown in FIG. 8 as mouse pointer 108 is moved closer to glyph 106. In these examples, glyph 106 is again associated with an object instance 102 of the object "ABC Inc." FIG. 10A illustrates an example of glyph 106-1 when mouse pointer 108 is not near to glyph 106. In this case, glyph 106-1 is fairly dim. FIG. 10B shows an example of glyph 106-2 when mouse pointer 108 is moved closer to glyph 106. In this case, glyph 106-2 is slightly brighter or more intense. And FIG. 10C shown an example of glyph 106-3 when mouse pointer 108 is very close to glyph 106. In this case, glyph 106-3 is very bright or very intense. In these examples, the visibility of glyph 106 equates to the increasing of the brightness or increasing of the intensity of a color characteristic of glyph 106 as mouse pointer 108 is moved closer to glyph 106. In other embodiments, changing the visibility of glyph 106 may include changing both the size and brightness of glyph 106. In still other embodiments, other visibility techniques, which may become apparent to one of ordinary skill in the art, can be used to communicate the nearness of mouse pointer 108 to a particular glyph 106.

FIG. 11 is a diagram illustrating the embodiment of GUI 100 shown in FIG. 8, wherein GUI 100 incorporates another aspect of the progressive access functionality described in the present disclosure. In this diagram, the mouse pointer (not shown) is moved over or into the field of glyph 106 (FIG. 8). The field of glyph 106 may include the outer boundary of glyph 106 or may include any suitable area within the vicinity of glyph 106. In some embodiments, the field of glyph 106 may include the dimensions of target 110, such that when target 110 is called up, the mouse pointer is already on top of target 110, allowing the user to more easily click on target 110. Target 110 in this instance is shown as the letter "i" within a box or button shape. In some embodiments, target 110 may simply be an enlarged version of glyph 106. In other embodiments, glyph 106 may gradually or instantaneously morph into target 110.

FIG. 12 is a diagram illustrating an embodiment of a GUI 120 showing another aspect of the progressive access functionality described in the present disclosure. In this embodiment, GUI 120 includes a target 122 that is called up when a mouse pointer is brought near or over a glyph associated with an object instance. The object in this example is for a person "Alicia Reynolds." When the user mouse-clicks on target 122, a dialog box 124 is displayed as shown in FIG. 12.

According to this particular embodiment, dialog box 124 includes a number of actions 126 related to actions that can be performed for communicating with this individual, such as "chat," "viewing notes," "scheduling a meeting," etc. Dialog box 124 also includes information 128. Particularly, this embodiment shows dialog box 124 with information related to a "company" that the person is employed by, a "department" of the company in which the person works, an "e-mail address," etc. It should be understood that, depending on the application and according to the particular object of interest, the dialog box 124 can include any suitable format or layout and can include any type of actions and information.

A feature of dialog box 124 is that it includes a close button 130 and an "X" button 132 for closing dialog box 124. This can be beneficial in the sense that the dialog box 124 is not inadvertently dismissed when the mouse pointer is moved off target 122, which can be a problem with conventional pop-up windows. A dialog box, according to the embodiments described herein, may include a "close" button or an "X" button or both. Furthermore, to maintain the concept of keeping a user in the context of a particular object instance, the buttons for closing the dialog box according to some implementations can be located on the dialog box near to target 122. In this way, when the dialog box is closed, the mouse pointer is still in the vicinity of the object of interest.

The systems and methods described herein allow access to actions and information related to an object of interest in a progressive fashion. Conventional systems often distract a user by navigating away from an object of interest, interrupting a current task to complete a related task, or pushing the display or dismissal of dialogs based on mouse location. The embodiments of the present disclosure overcome these problems by providing an uncluttered, subtle glyph that increases in visibility as a mouse is moved toward it. As the mouse moves toward the glyph, the user can hover the mouse over the glyph, which causes a target to pop-up or appear in some manner. The target is designed to be unobtrusive with other user interactions. If the user wishes to gain access to additional actions and information, the user can click on the target to call up the dialog box, as opposed to annoying pop-up windows opening and closing against the user's intentions.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A method comprising:
analyzing a position of a mouse pointer on a graphical user interface (GUI), the mouse pointer being controlled by a user-operated mouse;
displaying a glyph on the GUI, the glyph being associated with an object that is displayed on the GUI, wherein the glyph is displayed on the object to indicate that additional actions or information are available for the object and is not selectable, and wherein the display of the glyph varies based on a distance of the pointer from the object;
displaying a selectable target that replaces the glyph when the mouse pointer is positioned within a field of the glyph, wherein the target facilitates a selection by the pointer by being larger than the glyph and has a different appearance than the glyph; and
opening a dialog box to provide the additional actions or information associated with the object when a mouse click on the target is detected and when the mouse pointer is within a field of the target;
wherein the target overlays at least a portion of the object;
wherein the object comprises text within a table cell and the display of the glyph is unobtrusive relative to the text.

2. The method of claim 1, wherein, when the mouse pointer is not positioned within the field of the glyph, the method further comprises changing the visibility of the glyph based on a distance from the mouse pointer to the field of the glyph.

3. The method of claim 2, wherein changing the visibility of the glyph further comprises increasing the visibility of the glyph when the mouse pointer is moved closer to the glyph.

4. The method of claim 2, wherein changing the visibility of the glyph further comprises changing the size of the glyph.

5. The method of claim 2, wherein changing the visibility of the glyph further comprises changing the brightness of the glyph.

6. The method of claim 2, wherein changing the visibility of the glyph further comprises changing a characteristic of a color of the glyph.

7. The method of claim 2, wherein the distance from the mouse pointer to the field of the glyph is measured using a logical measure of proximity.

8. The method of claim 2, wherein the distance from the mouse pointer to the field of the glyph is measured in pixels.

9. The method of claim 1, wherein the method further comprises displaying a plurality of glyphs, each glyph associated with an object that is displayed on the GUI.

10. The method of claim 1, wherein the method further comprises waiting for a mouse click on a window-closing button of the dialog box and closing the dialog box when a mouse click on the window-closing button is detected.

11. The method of claim 1, wherein the object is related to at least one of an editable text field, a read-only field, the table cell, or a page header.

12. The method of claim 1, wherein displaying the target in place of the glyph further comprises morphing the glyph into the target.

13. The method of claim 1, wherein the table cell comprises four corners and the glyph is placed in one of the corners.

14. The method of claim 1, wherein the dialog box includes information and selectable actions.

15. The method of claim 14, wherein the selectable actions are related to a current task associated with the object.

16. The method of claim 1, wherein displaying the glyph further comprises positioning the glyph in an upper left corner of a field of the object.

17. A non-transitory computer readable medium configured to store instructions that are executable by a processing device, the computer readable medium comprising:
   logic adapted to analyze a position of a mouse pointer on a graphical user interface (GUI), the mouse pointer being controlled by a user-operated mouse;
   logic adapted to display a glyph on the GUI, the glyph being associated with an object that is displayed on the GUI, wherein the glyph is displayed on the object to indicate that additional actions or information are available for the object and is not selectable, and wherein the display of the glyph varies based on a distance of the pointer from the object;
   logic adapted to display a selectable target that replaces the glyph when the mouse pointer is positioned within a field of the glyph, wherein the target facilitates a selection by the pointer by being larger than the glyph and has a different appearance than the glyph; and
   logic adapted to open a dialog box to provide the additional actions or information associated with the object when a mouse click on the target is detected and when the mouse pointer is within a field of the target;
   wherein the target overlays at least a portion of the object;
   wherein the object comprises text within a table cell and the display of the glyph is unobtrusive relative to the text.

18. The computer readable medium of claim 17, wherein, when the mouse pointer is not positioned within the field of the glyph, the logic adapted to display the glyph is further configured to change the visibility of the glyph based on the distance from the mouse pointer to the field of the glyph.

19. The computer readable medium of claim 18, wherein the logic adapted to display the glyph is further configured to increase the visibility of the glyph when the mouse pointer is moved closer to the glyph.

20. A progressive access module that, when executed by a processor, provides access to contextual actions and information, comprising:
   a mouse analyzing module configured to analyze a position of a mouse pointer with respect to a graphical user interface (GUI) and to analyze when a mouse button is pressed, wherein the mouse pointer and mouse button are associated with a user-controlled mouse;
   a glyph handling module configured to display a glyph on the GUI, the glyph being associated with an object that is displayed on the GUI, wherein the glyph is displayed on the object to indicate that additional actions or information are available for the object and is not selectable, and wherein the display of the glyph varies based on a distance of the pointer from the object;
   a target handling module configured to display a selectable target that replaces the glyph when the mouse pointer is positioned within a field of the glyph, wherein the target facilitates a selection by the pointer by being larger than the glyph and has a different appearance than the glyph; and
   a dialog box handling module configured to open a dialog box to provide the additional actions or information associated with the object when the mouse pointer is located within a field of the target and on the target and when the mouse button is pressed;
   wherein the target overlays at least a portion of the object;
   wherein the object comprises text within a table cell and the display of the glyph is unobtrusive relative to the text.

21. The progressive access module of claim 20, wherein the glyph handling module is further configured to display a plurality of glyphs, each glyph associated with a respective object displayed on the GUI.

22. The progressive access module of claim 21, wherein the glyph handling module is further configured to display each of the plurality of glyphs in an upper left corner of the respective object.

23. A system for providing access to selectable actions and information associated with an object on a graphical user interface (GUI), the system comprising:
   means a display device for analyzing a position of a mouse pointer on the GUI, the mouse pointer being controlled by a user-controlled mouse;
   the display device displaying a glyph on the GUI, the glyph being associated with an object that is displayed on the GUI, wherein the glyph is displayed on the object to indicate that additional actions or information are available for the object and is not selectable, and wherein the display of the glyph varies based on a distance of the pointer from the object;
   the display device displaying a selectable target that replaces the glyph when the mouse pointer is positioned within a field of the glyph, wherein the target facilitates a selection by the pointer by being larger than the glyph and has a different appearance than the glyph; and
   the display device handling the opening and closing of a dialog box, the handling means configured to open the dialog box to provide the additional actions or information associated with the object when the mouse pointer is within a field of the target and when a mouse click on the target is detected;
   wherein the target overlays at least a portion of the object;
   wherein the object comprises text within a table cell and the display of the glyph is unobtrusive relative to the text.

24. The system of claim 23, wherein the display device is configured to display available actions and action-defining information within the dialog box.

25. The system of claim 24, wherein the available actions are associated with a current task related to the object.

* * * * *

UNITED STATES PATENT AND TRADEMARK OFFICE
CERTIFICATE OF CORRECTION

| | | |
|---|---|---|
| PATENT NO. | : 8,839,145 B2 | Page 1 of 1 |
| APPLICATION NO. | : 12/356789 | |
| DATED | : September 16, 2014 | |
| INVENTOR(S) | : Shores et al. | |

It is certified that error appears in the above-identified patent and that said Letters Patent is hereby corrected as shown below:

In the Specification

In column 2, line 24, delete "46" and insert -- 46. --, therefor.

Signed and Sealed this
Seventeenth Day of March, 2015

Michelle K. Lee
*Director of the United States Patent and Trademark Office*